United States Patent [19]

McKeown et al.

[11] Patent Number: 4,996,547

[45] Date of Patent: Feb. 26, 1991

[54] RADIAL ARM STRIKE RAIL

[75] Inventors: Mark H. McKeown, Golden; Steven C. Beason, Lakewood, both of Colo.

[73] Assignee: The United States of America as represented by the Secretary of the Interior, Washington, D.C.

[21] Appl. No.: 401,390

[22] Filed: Aug. 31, 1989

[51] Int. Cl.$^5$ ............................................. G03B 29/00
[52] U.S. Cl. ..................................... 354/81; 354/293; 33/281; 33/286; 33/304
[58] Field of Search .......................... 354/81, 293, 294; 33/1 H, 281, 282, 285, 286, 304; 352/243

[56] References Cited

U.S. PATENT DOCUMENTS 2,077,381 4/1937 Eastman ................................. 33/304
2,956,764 10/1960 Nakatani ............................... 354/293

Primary Examiner—Brian W. Brown
Attorney, Agent, or Firm—E. Philip Koltos

[57] ABSTRACT

The radial arm strike rail assembly is a system for measurement of bearings, directions, and stereophotography for geologic mapping, particularly where magnetic compasses are not appropriate. The radial arm, pivoting around a shaft axis, provides a reference direction determination for geologic mapping and bearing or direction determination. The centerable and levelable pedestal provide a base for the radial arm strike rail and the telescoping camera pedestal. The telescoping feature of the radial arm strike rail allows positioning the end of the rail for strike direction or bearing measurement with a goniometer.

2 Claims, 2 Drawing Sheets

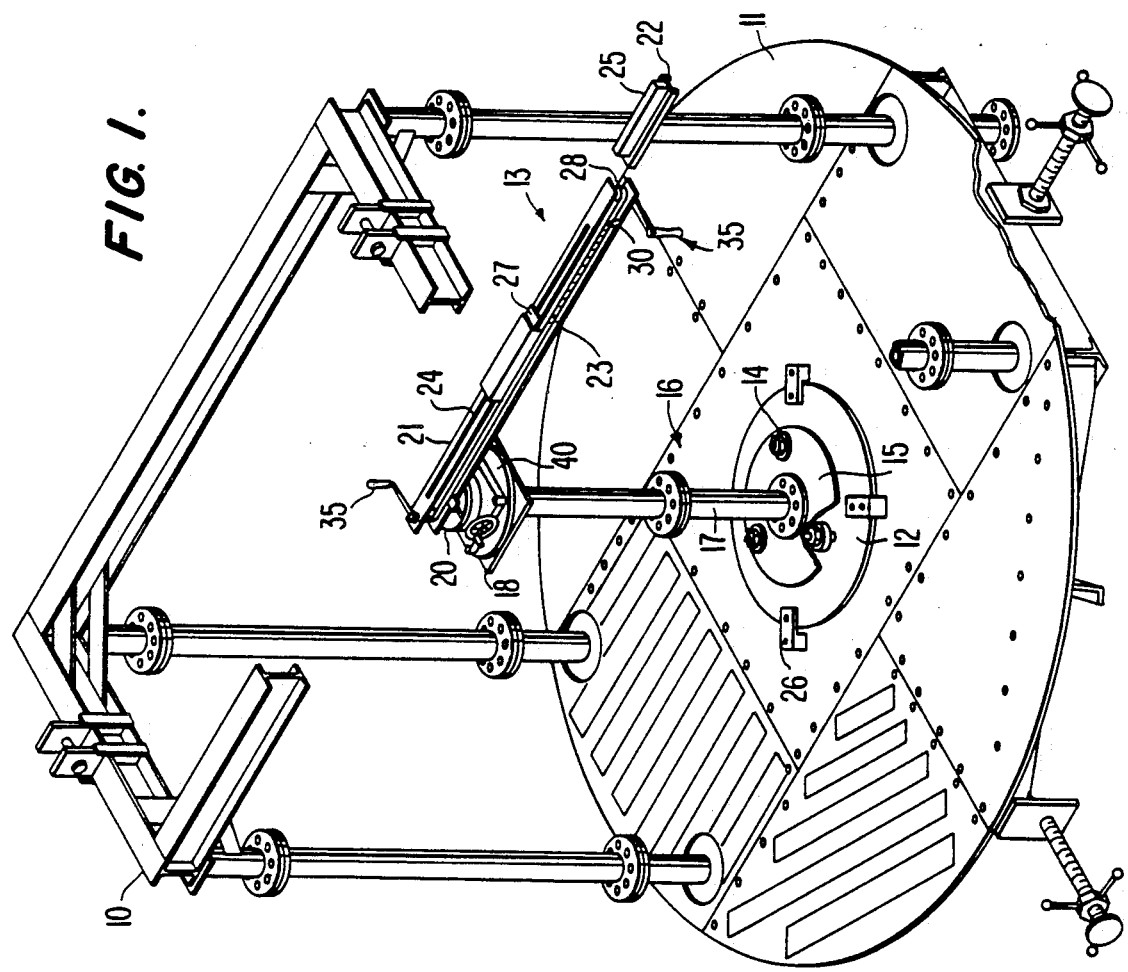

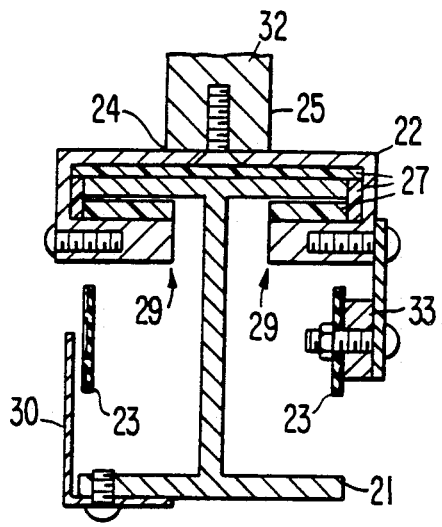
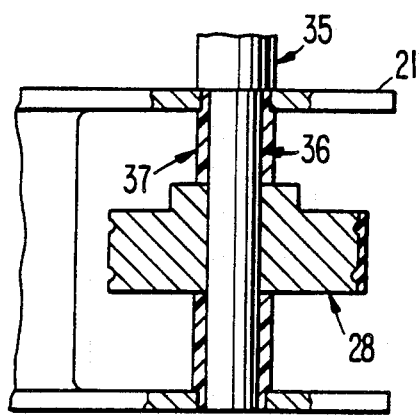
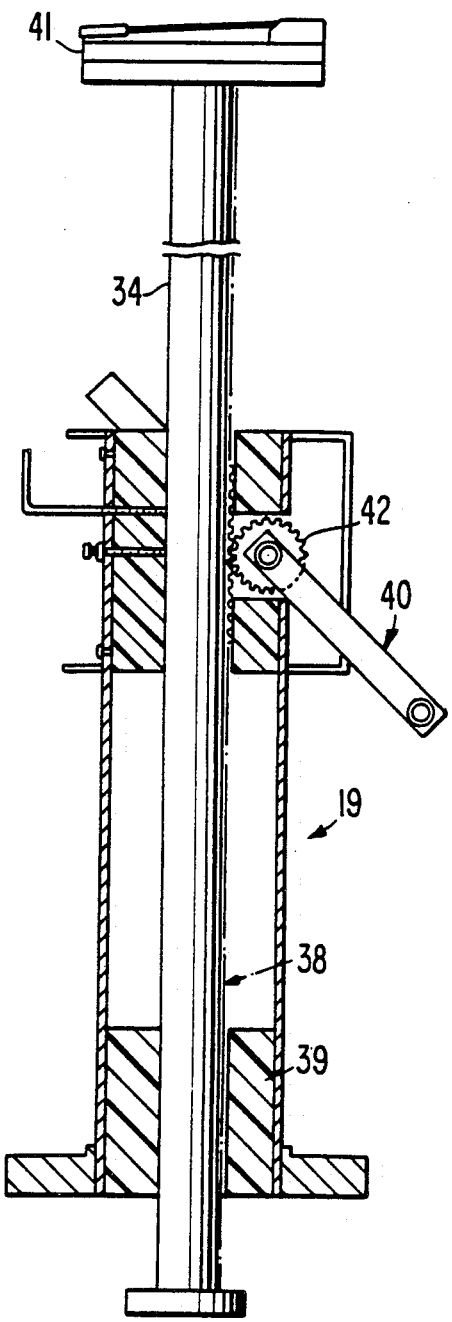

4,996,547

RADIAL ARM STRIKE RAIL

STATEMENT OF GOVERNMENT INTEREST

The invention described herein may be manufactured by or for the Government for governmental purposes without the payment of any royalty thereon.

BACKGROUND OF THE INVENTION

This invention relates generally to an accurate, movable and easily transportable system for distance measurement and geologic mapping in subterranean shafts. Accurate, dependable measurement of bearings and directions and stereophotography are required for geologic mapping in subterranean shafts, such as, for example, nuclear waste storage investigations. Subterranean sites presently being investigated are in rock with natural magnetism and also contain steel structures. These factors preclude the use of devices that rely on the earth's magnetic field for a reference direction, that is, a magnetic compass. Under these conditions, a surveyed reference (strike rail), is necessary with all directions or bearings related to the reference.

Utilizing a conventional strike rail is time consuming and therefore extremely expensive. Previous methods consisted of obtaining bearings or directions from surveyed rails that had to be pre-positioned around the periphery of the work platform. This method is not compatible with a galloway. Magnetic compasses have been used but are not dependable. Photography for geologic photography can be obtained by hand, holding the camera, or by using a conventional tripod. These methods are not suitable in this case because of the speed and precision requirements.

SUMMARY OF THE INVENTION

The instant invention overcomes the problems in the past by providing an accurate, movable, and easily transportable system for distance measurement and geologic mapping in subterranean shafts. The unit is intended to be compatible with a typical galloway or working platform commonly used in shaft construction. The instant invention allows measurement of bearings and directions non-magnetically and rapid stereophotography of excavation walls. In addition, rapid measurement of excavation size and discreet points on the walls are easily made. The radial arm strike rail (RASR) of this invention simplifies distance measurement and satisfies the need for direction measurement where magnetic compasses will not work.

The RASR assembly of this invention is mounted on a conventional platform which is included to show the RASR assembly as it is mounted on the platform. After centering and leveling the pedestal, either the radial arm strike rail or a telescoping camera pedestal is attached. The strike rail is then rotated and the bearing is read from the index table. If a goniometer is used for bearing or direction measurement, the base of the goniometer is set to the strike arm reading and measurements are read directly from the goniometer. Radial distances from the pedestal centerline are read directly from the scale attached to the strike rail. Once the RASR assembly is located and surveyed, the geologic mapping, photography and measurement can be done without resurveying. For geologic photogrammetry, a telescoping camera pedestal is attached to the previously centered and leveled lower pedestal and then the camera is attached to the camera mount indexing plate. The camera mount telescopes up and down for stereophotography and is indexed every 60 degrees horizontally for photograph overlap. All measurements and photography are accurate and repeatable.

It is therefore an object of this invention to provide a radial strike rail assembly which is easily set up for use and them removed.

It is another object of this invention to provide a radial strike rail assembly which is therefore extremely useful in providing a reference direction for geologic mapping and bearing or direction determination.

It is still another object of this invention to provide a radial arm strike rail assembly which is more durable and will maintain calibration better than permanently installed reference rails.

A Still further object of this invention is to provide a radial strike rail assembly which provides measurements and photography which are repeatable and very accurate.

For a better understanding of the present invention, together with other and further objects thereof, reference is made to the following description taken in conjunction with the accompanying drawings and its scope will be pointed out in the appended claims.

DETAILED DESCRIPTION OF THE DRAWINGS

FIG. 1 is a perspective view, partially in section, of a shaft mapping platform and radial arm strike assembly of the instant invention.

FIG. 2 is a cross section assembly of the radial arm strike rail.

FIG. 3 is a cross sectional assembly of a belt pulley and drive of the radial arm strike rail assembly.

FIG. 4 is a side view, partially in section, of a telescoping camera pedestal assembly.

DETAILED DESCRIPTION OF THE PREFERRED EMBODIMENT

Reference is now made to FIG. 1 of the drawings which shows in perspective view, a shaft mapping platform and radial arm strike rail assembly of the instant invention. The shaft mapping platform comprises a support structure 10, a floor plate 11, and a base 12 fastened by clamps 26. The radial arm strike rail 13 of this invention is attached to base 12. Attached to the base 12 is the support stand shown generally at 16 which comprises a lower pedestal 17 and an upper extension and mounting plate 18. The pedestal 17 forms the base for both the radial arm strike rail 13 and the camera pedestal 19 shown in FIG. 4. Lower pedestal 16, with a bull's eye level (not shown) available from McMaster-Carr, positioned in the center hole of the flanged top of the lower pedestal 17 and is used to center (by moving the base 12) and level (by adjusting the leveling screws 14). After centering and leveling the pedestal 17, either the radial arm strike rail 13 or the telescoping camera pedestal 19 are attached.

The radial arm strike rail 13 consists of a horizontally graduated base (360 degrees) or a rotary indexing table 20 with a telescoping arm or strike rail 21. The extension arm 22 is moved in and out along the strike rail 21 by a cog belt 23 and crank system shown in section in FIGS. 2 and 3. The exact distance from the center of the pedestal 17 is read directly from a scale 24 on the main strike rail 21. The position of the end of the extension arm 22 is indicated on the scale 24 affixed to the top of the main strike rail 21. A goniometer (not shown) is positioned on the instrument mount 25.

Radial arm strike rail 13 is shown in section in FIG. 2. Strike rail 21 forms the base for extension arm 22 which slides on the surface of bearing 27. Pulleys 28, located on opposite ends of strike rail 21 provide rotary support for cog belt 23. Guide bars 29 retain extension arm 22 on strike rail 21. Instrument mount 25 is affixed to strike rail 21 with screws 32. Cog belt 23 is fastened to strike rail 21 by belt mount 33.

FIG. 3 is a cross sectional view of the assembly of a belt pulley drive and comprises belt pulley 28 mounted on shaft 36 and supported between opposing ends of strike rail 21 by bushings 37 and driven by handle 35 which is affixed to one end of shaft 36.

FIG. 4 is a side view, partially in section of a telescoping camera pedestal 19. Shaft 34 is cut to suit a tight fit for a 20 degree pressure angle steel rack 38 which is adapted to slide vertically within teflon or other suitable material bearings 39 when cranked by handle 40. Camera mount 41, commercially available, is mounted on the upper end of shaft 34. Spur gear 42, keyed to the shaft of handle 40 engages steel rack 38 when assembled and provides the telescoping action when handle 40 is cranked.

SYSTEM OPERATION

The telescoping camera pedestal 19 is attached to the previously centered and leveled lower pedestal 17 and then the camera is attached to the indexing plate of the camera mount 41. The camera is then positioned vertically with the pinion crank handle assembly to the appropriate position. The camera is then rotated horizontally to the starting point for the series of photographs and the photographs are taken. Each photograph has an index stop. In the initial testing, a photograph is taken every 60 degrees horizontally. After a series of photographs is taken, the camera is then raised or lowered as appropriate to the next vertical location and another series of photographs is taken.

The radial arm strike rail 13 is attached to the previously centered and leveled lower pedestal 17. The clamps on the index table 20 base plate are loosened and the table 20 is rotated to a known direction such as north or zero degrees. The clamps then tightened, thus clamping the index table 20 base plate to the mounting plate 18. The strike rail 13 is then rotated via the indexing table 20 and the bearing of the radial arm strike rail 13 is read from the index table 20. If a goniometer is used for bearing or direction measurement, the base of the goniometer is set to the radial arm strike rail 13 reading and measurements are read directly from the goniometer. Radial distances from the pedestal centerline are read directly from the scale 24 attached to the radial arm strike rail 13. The scale 24 reads the distance from pedestal centerline to the tip of the extension arm. Measurements above the horizontal strike rail 13 are made by tilting the indexing table 20 and therefore raising the end of the extension arm 22. The distance is then calculated.

For stereophotography the radial arm strike rail assembly 13 is removed from the lower pedestal 17 and then the camera is attached to the camera mount 41 indexing plate. The camera is then positioned vertically with the pinion crank handle 40 to the appropriate position. The camera is then rotated horizontally to the starting point for the series of photographs and the photographs are taken. Each photograph location has an index stop.

While the invention has been described in its preferred embodiment, it is to be understood that the words which have been used are words of description rather than limitation and that changes may be made within the perview of the appended claims without departing from the true scope and spirit of the invention in its broader aspects.

What is claimed is:

1. Apparatus for aligning a geologic bearing or direction measuring device to a target point comprising:
   a shaft mapping platform having a lower pedestal attached to a level adjusting plate adapted to be centered and leveled,
   an upper pedestal mounted on said lower pedestal,
   a rotary indexing table mounted on said upper pedestal,
   a strike rail mounted on said rotary indexing table, said strike rail having a first pulley and crank mounted on a first end, a second pulley and crank mounted on a second end, and an indicating scale located on a top surface,
   an extension arm adapted to be slidably movable from a center position along said strike rail to an outer position,
   a cog belt mounted on said adapted to be driven by said first and second pulleys, said cot belt being fastened to said extension arm and adapted to move said extension arm,
   a scale affixed to an outer surface of said cog belt; and
   a pointer mounted vertically on said second end of said strike rail and adapted to indicate radial distance of horizontal movement of said scale and said extension arm.

2. Apparatus for aligning a geologic bearing or direction measuring device as set forth in claim 1 in which said lower pedestal contains a bubble level positioned at an upper end and is attached to said level adjusting centering plate at a lower end.

* * * * *